Jan. 13, 1948.  R. L. KERR  2,434,618
AIRCRAFT PICK UP AND ARRESTING DEVICE
Filed June 8, 1944  8 Sheets-Sheet 5

Inventor
Ralph L. Kerr
By
Marechal and Biebel
Attorneys

Inventor
Ralph L. Kerr
By Marechal and Biebel
Attorney

Jan. 13, 1948.    R. L. KERR    2,434,618
AIRCRAFT PICK UP AND ARRESTING DEVICE
Filed June 8, 1944    8 Sheets-Sheet 7

Jan. 13, 1948.    R. L. KERR    2,434,618
AIRCRAFT PICK UP AND ARRESTING DEVICE
Filed June 8, 1944    8 Sheets-Sheet 8

Inventor
Ralph L. Kerr
By Mareschal and Biebel
Attorneys

Patented Jan. 13, 1948

2,434,618

UNITED STATES PATENT OFFICE 2,434,618

AIRCRAFT PICKUP AND ARRESTING DEVICE

Ralph L. Kerr, Houston, Tex., assignor of one-half to Theodore N. Law, Tulsa, Okla.

Application June 8, 1944, Serial No. 539,324

4 Claims. (Cl. 258—1.2)

This invention relates to aircraft equipment and more particularly to an aircraft pickup or arresting device.

It is the principal object of the invention to provide an energy absorbing device suitable for use with aircraft for equalizing the velocity of one body relative to another and in which a reel and cable are arranged to be unwound under continuously controlled braking conditions in order to establish a smooth and uniform change in the velocity of such body.

It is also an object of the invention to provide a pick up or arresting device for aircraft use which is relatively simple in construction and operation, light in weight such that it can be readily carried by the aircraft, and which provides for picking up and accelerating the load, or decelerating the plane when used as an arresting device, smoothly and without objectionable shock, and without requiring attention from the operator during the time the contact is being made thus leaving him entirely free to handle the plane.

It is also an object to provide such a device in which the braking is done hydraulically and under continuously controlled, smooth and highly uniform conditions.

It is a further object to provide such a device in which the action of the hydraulic brake is supplemented at the time the operation is substantially completed by means of an auxiliary brake which is applied for holding the cable against further unwinding.

It is a further object to provide for automatically regulating the unwinding action of the reel to maintain a desired and substantially uniform rate of acceleration and controlling the operation from a remote point such as the main control location of the plane.

It is a further object to provide such a device which provides for rewinding the towing cable during the towing operation to establish the proper and most advantageous spacing between the towing plane and the glider or load for any flight condition, and for thereafter maintaining that spacing.

It is also an object to provide a device which may be adjusted in advance in accordance with the weight characteristics of the load to be picked up so that a proper and substantially smooth and uniform acceleration of the load, or deceleration of the plane, without objectionable shock will be obtained notwithstanding wide variations in the amount of such load.

It is also an object to provide such a device in which the reel on which the cable is wound is so protected that the reel unwinds smoothly, overcoming any tendency for the cable to cut down into the body of the turns remaining on the reel under the high stress developed in the cable particularly at the instant the initial contact is made.

It is a still further object to provide a manually operable control means through which the operator, after the pickup has been completed and the load has attained full flight speed, may readjust the spacing of the load with respect to the towing plane, a single control element providing for the rewinding of the cable and for the application of a brake means to hold the reel in desired position.

It is a further object to provide a control for such a device which may be located at any desired location remote from the working parts of the device in position for ready accessibility on the part of the operator.

In the drawings, which disclose a preferred embodiment of the invention.

The present invention relates to an aircraft pickup and arresting device which may be used for the picking up of an article such for example as mail bags, packages, or gliders, and in general any article which it is desired to pick up and carry in flight or to transfer to a moving airplane in flight, or the speed of which it is desired to reduce as in the landing of an aircraft or other load in high speed movement.

It has particular application to the picking up of a glider by a plane while in flight, and provides for the picking up of gliders of varying size and weight, assuring the acceleration of the glider at a predetermined rate which can be readily selected or adjusted to avoid objectionable shock to personnel carried on the gliders. The picking up of gliders carrying personnel is a matter requiring substantially more precision and control than the picking up of inanimate objects, and is further complicated by the desire to keep the rates of acceleration relatively low, to avoid discomfort to the passengers. In accordance with the present invention, a glider at rest and containing passengers may be picked up by an airplane in flight and accelerated up to the full flight speed of the plane with a minimum of shock and discomfort, and without the use of an excessive length of cable, the latter factor being of primary importance from the standpoint of conserving on weight and unnecessary use of materials.

Further, the invention provides a pick up device which may be preadjusted in accordance with the known load characteristics of the load to be picked up to provide for establishing and maintaining a controlled and substantially uniform acceleration rate, thus providing for properly picking up loads of widely different weight. Notwithstanding wide variations in the actual load to be picked up, the same high degree of safety and comfort for passengers may be provided for all pick up operations.

Further, the invention is also directly applicable in the case of aircraft arresting gear, where for example it is desired to obtain proper deceleration of an aircraft when landing, a typical situation being the landing of an aircraft on a carrier, or in any other restricted landing area. With the use of the present invention, the deceleration of the plane is accomplished smoothly, without objectionable shock to the plane, and under controlled conditions such as to bring about the most effective and desired rates of deceleration, which may also be predetermined in accordance with the weight of each individual plane.

The invention thus may be considered as incorporating an energy absorption device for absorbing the kinetic energy required to bring about the same relative velocity or to equalize the velocities of two bodies initially having substantially different velocities. The amount of the energy required to be dissipated is substantial, particularly where relatively large masses are accelerated or decelerated, and where the original velocity differences are substantial. The invention is highly advantageous in its utilization of hydraulic equipment for dissipating such energy, thus avoiding the irregularities and maintenance problems encountered where friction brakes are utilized. The provision of hydraulic equipment assures proper, accurate, and substantially uniform control of the braking effect and hence of the acceleration or deceleration rates, and also avoids the necessity for repair and replacement of brake linings or comparable parts of a friction brake.

The invention further provides for overcoming the objectionable shock condition encountered at the instant the pickup is made, assuring the proper unreeling of the tow cable, and likewise making it possible for the mechanism to be rapidly accelerated to the necessary unwinding speed. When the relative velocity between the two moving bodies has been brought to zero, such as at the completion of the pickup operation when the load is in full flight, the invention further provides for the rewinding of the extended tow cable, with the expenditure of a relatively small amount of power, in order to locate the load at the most satisfactory spacing from the towing plane, for continued flight. Having established the desired position of the load, the cable is properly held against any further unwinding, and flight then continues as desired.

The entire mechanism is arranged for convenient operation, such that it can be controlled from the cockpit or other control location in the towing plane, including the preselection of the setting of the device to determine the desired rate of acceleration in relation to the characteristics of the load, and the several operations occurring in the course of the pickup operation. The controls are simplified and made readily available or accessible so that they require a minimum of attention on the part of the operator during the operation, thus leaving the operator if the pilot entirely free during the critical period when the pickup is being made, to devote his entire attention to the handling of the plane with the satisfaction of knowing that the pickup device will function without requiring attention, until the load is completely accelerated, and in full flight, at which time he will be free to make the necessary adjustments and to determine the desired spacing between the towing plane and the glider.

While the invention is applicable either for the picking up of loads by an airplane in flight, or the arresting of an airplane when landing, the former case will be more fully described hereinafter, for purposes of illustration, it being understood however that it is essentially applicable for both purposes. Referring to the drawing, which illustrates a preferred embodiment of the invention, the device comprises a main base plate 10 to which are secured upwardly extending bracket members 11 and 12, fastened to the base plate by the means of a series of bolts 13. Bracket 11 is bored to provide a seat for a ball bearing shown at 15 which is retained in place by a locking ring 16, removably secured to the face of the bracket by means of a series of bolts 17. Suitable packing 18 is provided in an annular pocket 19 on the opposite side of the bracket for preventing escape of fluid axially along the shaft.

Bracket 12 serves as a support for ball bearing 20 which is secured in place thereon by means of oppositely arranged plates 21, 22, which are secured by means of bolts 23, suitable packing 24 also being provided at this bearing to prevent escape of lubricant.

Figures 1, 16:
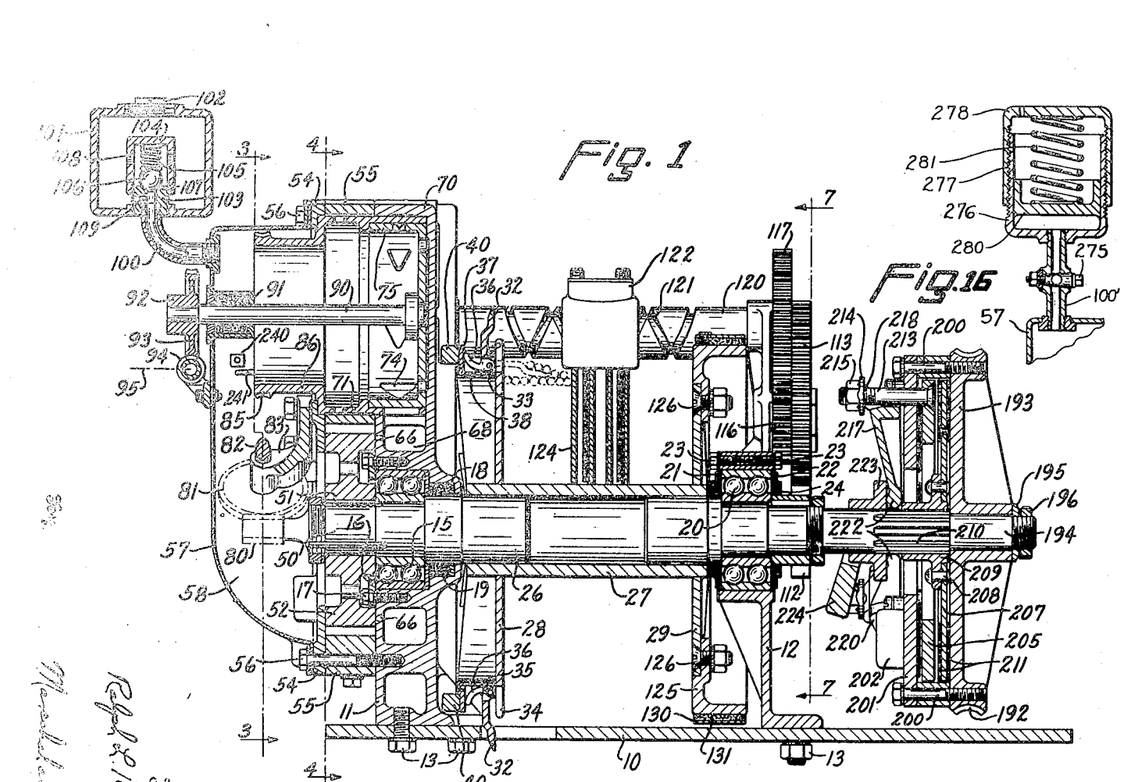
Fig. 1 is a central vertical sectional view of a device constructed in accordance with the present invention.
Fig. 16 is a detail sectional view showing a construction of expansion chamber.

A main shaft 26 is journaled in the respective bearings 19 and 20, and serves as the support for the cable reel located between the bearings, comprising the inner sleeve 27, and side wall plates 28 and 29. The reel is of sufficient depth and axial extent to receive the necessary length of cable thereon, such that when fully wound the outermost layer of the cable extends radially outwardly to substantially the level indicated in Fig. 1. If desired the shaft 26 may be formed in two parts, as shown in Fig. 1, omitting the portion centrally of sleeve 27 to reduce weight.

When the pick up contact is first made, the reel is at rest, and must be accelerated in order to assume a proper speed of rotation to discharge the cable at the required rate. This initial contact tends to create a sharp pull in the cable, and to reduce the shock as much as possible a suitable shock absorbing or yielding device, or a length of flexible cable, is preferably used to allow a short interval for the reel to speed up to its proper unwinding speed. In order to avoid the tendency of the cable to cut down into the remaining turns on the reel under this initial shock condition, and thus to delay the desired unwinding action, the invention provides means for preventing this action regardless of the initial condition of stress in the cable. For this purpose, a plurality of fingers 32 are pivotally mounted as shown at 33 on the outer face of the side wall 28 of the reel, and adjacent but radially inwardly of the outer periphery of such wall. The fingers may pivot about their supports 33 to extend through notches 34 in the wall 28 and are located at such radial position as to extend inwardly below the outermost layer on the reel, at approximately the level thereof as shown. The fingers are of a length to extend axially under some four or five turns comprising the last turns on the reel, i. e., the first turns to be unwound from the reel. It will be clear from the showing in Fig. 1 that when so wound, the fingers will be retained in this position by the outermost turns on the reel, and that when the initial pick up contact is made, the unwinding cable will not be permitted to cut into the body of the remaining turns on the reel, but will be supported on the several fingers 32 distributed around the periphery of the drum. When sufficient unwinding has taken place to free the turns bearing against the fingers, the fingers are then free to pivot about their axes 33, and since the drum is then in rotation, a centrifugal force is developed which acts on the fingers to throw them to the clearance position indicated in full lines in Fig. 1, so that they no longer have any effect with respect to the unwinding of the remaining turns. This action may be facilitated by the use of coil springs 35 where desired. It will be understood that the length of the fingers is such as to extend the protecting action for as long a time as needed, and until the reel has been accelerated sufficiently to avoid the possibility of further cutting of the cable into the turns remaining on the reel, experience having shown that a length corresponding to approximately four to five turns is usually sufficient.

In order to control the position of the fingers, and to return them to the protective position at the proper point in the rewinding of the cable, each finger is formed with curved ends 36 which are adapted to be engaged by a ring 37 riding along the flange 38 fastened to the end wall 28 of the reel. Ring 37 is slidingly engaged by the arms of yoke member 40 which is mounted for pivotal movement about the pins 41, 42, adjustably mounted in bracket 43 which in turn is supported from base plate 10. Suitable control connections represented in a diagrammatic way at 40' are extended from yoke 40 to the control position in the plane by means of which the pilot at the proper point in the rewinding operation can effect the actuation of the yoke to move it axially to the right in the relationship shown in Fig. 1, thereby effecting a corresponding movement in ring 37, which upon engaging the cam surfaces 36, causes the return of the several fingers into the dotted line protective position, to permit the remaining outermost turns of the cable to be wound thereon. Thereupon the control yoke and ring 37 are released, so that the fingers will be free to travel outwardly when the pickup is made, in the manner described above.

In order to provide the required braking action for the reel, and to absorb the energy necessary to check the unwinding action thereof, hydraulic brake means are provided. For this purpose, shaft 26 has an extended portion 50 which overhangs bearing 15, and which is keyed as shown at 51 to provide for the driving of main pump gear 52. This gear operates in a pump chamber one wall of which is formed by the side of bracket 11, the other wall being formed by a housing plate 54. A generally ring shaped member 55 forms the outer periphery of the chamber and the parts just described are assembled by means of a series of bolts 56. To the outer face of the plate 54 and standing in spaced relation with respect thereto there is secured the cover plate 57, also held in place by means of the bolts 56, the cover forming a reservoir 58 for receiving and supplying the hydraulic fluid to the pump.

The ring section 55 is suitably recessed to provide for receiving a plurality of cooperating pump gears 60 located symmetrically around the periphery of the main gear 52, and meshing individually therewith. Thus each of the gears 60 in relation to the main gear forms a separate hydraulic pump, the several pumps thus formed being arranged to be supplied in common from the reservoir and likewise to discharge the fluid under pressure into a common manifold chamber. The number and the spacing of such gears will be determined as desired to develop the necessary pumping capacity for each particular installation, in the arrangement shown four pump gears 60 being shown.

Figure 4:
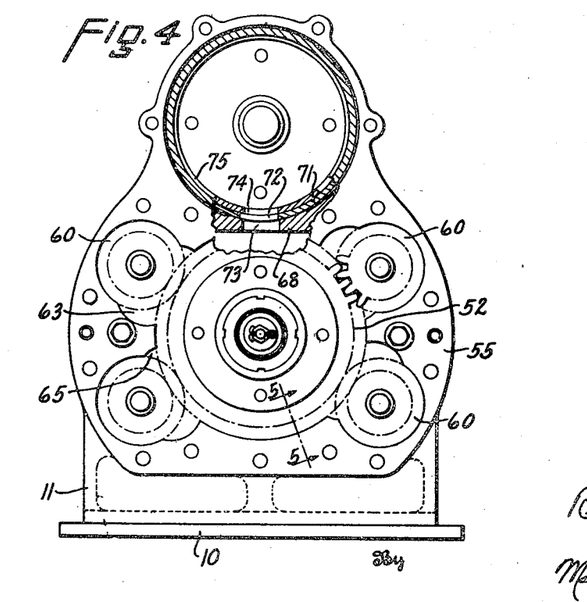
Fig. 4 is a vertical sectional view on the line 4—4 of Fig. 1.

The housing plate 54 is provided with a series of kidney shaped openings 62 which provide direct communication from the reservoir chamber into the inlet space 63 for each of the several pumps. Viewing the device as shown in Fig. 4, the rotation of the main gear in that figure is counterclockwise, so that passages 63 constitute the supply side of the respective pumps.

A smaller passage 65 is provided at the discharge side of each pump, and these passages are sealed off from the reservoir 58 by the housing plate 54 on the supply side. Passages 66 are formed in communicating alignment with the passages 65 and extend through the web of bracket 11 to provide for discharging the fluid under pressure into an annular manifold chamber 68 formed as a cored interior passage in bracket 11. The discharge from all of the pumps is supplied into the manifold 68 which thus receives the high pressure fluid discharged by the pumps.

It will be evident from the above that in response to the unwinding action of the reel under the force developed in the pickup cable, shaft 26 is rotated and with it the main pump gear 52 is correspondingly rotated, which by its engagement with the pump gears 60, provides a pumping action to supply the fluid from the reservoir under pressure into the discharge manifold 68. This pumping action continues in direct relation to the rate of rotation of the shaft 26.

It is desired to provide a controlled braking action, which at the beginning of the pickup is negligible so as to provide the greatest freedom for the necessary acceleration of the reel and other parts of the mechanism, and which thereafter increases progressively up to the point where the further unwinding action of the reel is substantially entirely checked, when the load has been accelerated and placed in full flight at the same speed as the towing plane. Not only does this require a progressive variation in the braking action, but there are other variable factors involved in determining the proper amount of braking action to be developed. Thus at the beginning of the unwinding operation the diameter of the cable on the reel is a maximum, that diameter gradually being reduced so that with a constant rate of acceleration, the speed of rotation of the reel would be necessarily increased in a series of successive stages as each succeeding layer of the cable is unwound therefrom. Further, as the energy is dissipated in the fluid, its temperature rises with a corresponding tendency for a change in the viscosity thereof so that for a given rate of acceleration, the required orifice area would be altered. As a result, therefore, it is desired to provide a changing resistance, in the shape of an orifice of variable cross-section through which the fluid is discharged, the exact cross-section of the orifice, and hence the the degree of load applied, being predetermined throughout the entire unwinding operation, in direct relation to the progress thereof.

For this purpose, an upwardly extending portion 70 of bracket 11 is recessed to provide for receiving a cylindrical valve member 71 therein, such member being rotatably mounted between flange 70 and the housing plate 54. The valve member 71 is formed with an aperture 72 which is aligned with a passage 73 in the upper wall of the manifold chamber 68, and with an aperture 74 formed in a selective non-rotating valve chamber member 75 which can be set in any predetermined position of adjustment and which remains in that position during any one pickup or arresting operation. The aperture 74 is relatively broad at one end and tapers to a point at the other end, providing a varying cross-section as shown, so that as the aperture 72 moves relative to aperture 74, from the broad end toward the narrow end thereof, the effective opening or orifice will be progressively reduced in cross-section. In the final position the aperture may be either entirely closed or substantially so, leaving only a a very small passage such as to permit very slow rate of rotation of the reel under power actuation.

As pressure fluid is supplied to the manifold chamber 68, it flows through the passage 73 and at the beginning of the pickup flows freely through the aligned apertures 72 and 74. The aperture remains relatively large during the unwinding of the first few layers but as the operation proceeds, the valve 71 moves relative to the aperture 74, and gradually reduces the effective area. The aperture 74 has been shown as triangular in shape but its shape and also that of aperture 72 may be changed as desired. By suitably shaping the contour of the apertures, and by properly correlating the travel of valve 71 in relation to the unwinding action, it will be apparent that a predetermined and progressively varying resistance will be established for all conditions throughout the entire unwinding operation.

In order to provide for the rotation and adjustment of the valve 71 with respect to the unwinding operation of the reel, shaft extension 50 is formed with a worm gear 80 which meshes with a worm wheel 81 mounted on drive shaft 82 which is rotatably supported at a suitable angle in bracket arm 83 bolted to the housing plate 54. Shaft 82 carries a pinion 84 which is in direct driving engagement with worm gear 85 carried on a forwardly extended portion 86 of valve 71. By suitable choice of the gear ratios thus provided, it will be evident that the valve 71 can be made to rotate a desired angular amount while the reel is being unwound, for example about 20 to 30 degrees of arcuate travel from the beginning to the end of the unwinding operation. The arrangement is preferably such that at the end of the operation when it is desired to stop the further unreeling of the cable, the cylinder has traveled so as to approximately completely close over apertures 74, thus preventing further unwinding action. Such blocking action however is effected gradually, and there is no sharp application of a braking force such as might result in the building up of high stress conditions.

In order to provide for the picking up of loads of different weight, it is desirable to provide for a uniform rate of acceleration, thus avoiding too great a shock in the picking up of a light load, or the necessity for paying out too great a length of cable in the picking up of a heavy load. In accordance with this invention the rate of acceleration is made a substantially uniform value, regardless of the actual weight of the load being picked up, resulting in a uniform length of time to effect the pick up and the paying out of a substantially uniform length of cable, notwithstanding wide variations in the load.

Figure 6:
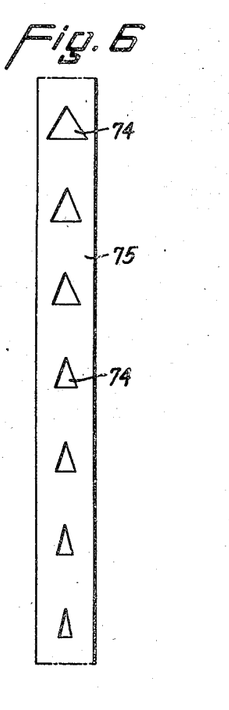
Fig. 6 is a developed view showing the series of apertures in the adjustable valve member.
Figure 7:
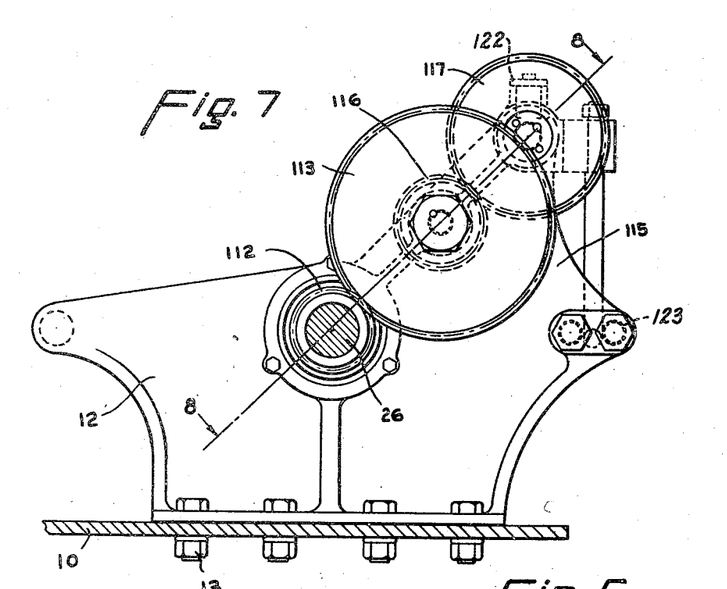
Fig. 7 is a vertical sectional view showing the drive for the level wind mechanism on the line 7—7 of Fig. 1.
Figure 8:
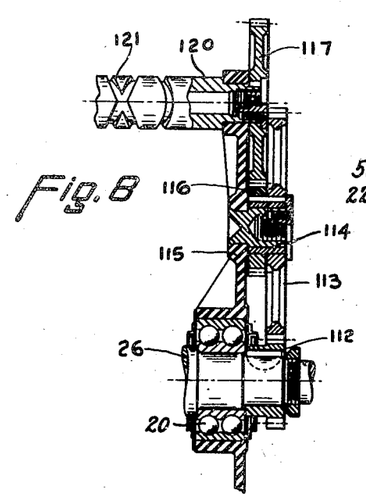
Fig. 8 is a sectional view through the level wind drive on the line 8—8 of Fig. 7.

In order to accomplish these results, means are provided for varying the braking action, and hence predetermining the energy which will be dissipated in the operation of the brake. For this purpose the valve member 75 is mounted for adjustment upon shaft 90, such shaft extending outwardly through the housing 57, suitable packing 91 being provided to prevent escape of fluid from the reservoir. Outwardly of the casing a hub 92 is fixed to the shaft which is formed with a worm gear 93 adapted to mesh with a worm shaft 94 which is actuated from the cabin or cockpit by a suitable control represented diagrammatically at 95. Valve member 75 is formed with a series of apertures 74 which are each of different shape and size, corresponding to different loads to be picked up. Thus as shown in Fig. 6 where the valve member 75 has been developed in a flat plane, seven such apertures are illustrated, progressively varying from a large area suitable for use in picking up a small load, to the smallest size aperture to be used in the picking up of the maximum weight load. For example, with the range of size as illustrated, loads varying from 2000 pounds to 14,000 pounds in steps of 2000 pounds may be picked up each with a substantially uniform rate of acceleration and with a substantially uniform length of cable being unreeled. It will be understood that the pickup is made with knowledge of the actual weight involved, and the cockpit control then set to position the selected aperture 74 in line with the opening 72 in the manifold pressure chamber, the valve 75 thereafter remaining in fixed position throughout the particular pickup operation, in the manner already described.

In the course of the unwinding action which takes place in a brief period of time, usually of the order of a few seconds, a substantial quantity of energy is dissipated in the forcing of the hydraulic fluid through the restricted aperture, resulting in a marked increase in the temperature of the fluid. This heat is conducted into the mass of the parts forming the reservoir and to some extent is thus dissipated, but provision is also made for a temperature rise in the fluid itself, accompanied by expansion thereof. In order to provide for this expansion, the casing 57 is formed with a connecting tube 100 in the upper end thereof which leads into an expansion chamber indicated generally at 101 having a removable filler plug 102 through which fluid may be supplied to the reservoir. Preferably an additional feature is incorporated, namely, a means for creating a super-atmospheric pressure in the reservoir during the unwinding operation, thereby assuring the supply of fluid into the inlet sides of the several pumps, and avoiding possible cavitation taking place under the high speeds of rotation thereof. For this purpose, tube 100 is threaded into a nut 103 which has threads on its outer periphery by means of which it is locked in the walls of the expansion chamber 101. The threaded part extends inwardly above the wall of the chamber, providing for receiving an adjustable cage 104 thereon. The cage fits downwardly over the nut and a spring 105 is interposed between the cage and a check valve in the form of ball 106 which rests upon a valve seat 107 formed in the upper face of the nut. The cage is slotted as shown at 108 to permit free passage of the fluid therethrough. Also there is a small size passage 109 which leads directly from the expansion chamber into tube 100, below the check valve.

The operation of this device is as follows: When the fluid begins to expand, under the heat developed during the unwinding operation, it tends to flow upwardly through tube 100, but will not be permitted to escape under the check valve 106 until a pressure is developed in excess of that required to raise the ball from its seat. Port 109 is open but its capacity is so limited relative to the rate at which the fluid pressure is developed that it does not materially affect the operation or relieve the pressure condition which is established. When sufficient pressure is created to lift the ball from its seat, further expansion of the fluid results in its discharge into the expansion chamber, the fluid flowing freely out of slots 108. However the pressure condition which is thus established is transmitted throughout the entire body of fluid within the reservoir 58 so that a definite super-atmospheric pressure condition is established on the inlet side of the pump and cavitation is thus effectively avoided. Adjustment of this pressure is obtained by suitably changing the position of the cage 104 upon nut 103, thus varying the spring pressure applied to the check valve 106, a suitable pressure being for example up to one or two atmospheres. After the unwinding operation is completed, and the fluid begins to cool and thus contract, such operation occurs much more slowly, and the port 109 permits the expanded fluid to by-pass valve 106 and to gradually flow back into the reservoir to keep the latter filled. This action thus occurs without the necessity for any actuation on the part of the pilot and assures that the proper pressure will be developed on unwinding and that the fluid will be returned to the reservoir following each operation in preparation for the next. It is desirable to avoid use of unnecessary quantities of fluid, and to effectively handle and circulate the fluid in use, using only such quantity as necessary to avoid an objectionably high or dangerous temperature rise toward the flash point of the oil; the saving in fluid results in a corresponding reduction in weight of reservoir and associated parts.

Means are also provided for assuring the level winding of the cable upon the reel. Thus a level wind mechanism is shown which includes pinion 112 keyed to the overhanging of shaft 26, immediately adjacent bearing 20, pinion 112 meshing with a large gear 113 which is mounted upon a sleeve 114 rotatably journaled in web 115 which is preferably integral with bracket 12. The sleeve 114 carries pinion 116 which meshes with large gear 117, thus providing a high gear reduction for the driving of the level wind shaft 120. This shaft is formed with reverse helices 121, the follower 122 being arranged to travel from side to side of the reel during the winding and unwinding action while supported against rotation by contact with parallel shaft 123. The follower carries a cable guide in the form of an elongated U-shaped guide member 124 which if desired may be formed with rollers as shown for keeping the friction as low as possible, thus properly guiding the cable across the face of the reel throughout all of the layers thereof.

The hydraulic brake is desired for use during the acceleration, but is not suitable for use during the actual towing of the load, since even a small amount of creep would be undesirable as entailing the passing out of additional cable. Accordingly it is desired to provide auxiliary brake means, preferably in the form of a friction brake, the action of which is correlated with the pickup operation, so that it becomes operative only after the acceleration of the load has been substantially completed, and during the time that the load is held in fixed towing relation. This auxiliary brake, therefore, does not provide for the dissipation of the main quantity of energy involved in the pickup operation, and thus may be made relatively small and light in weight, and any normally occurring variations in its frictional braking force being without adverse effect upon the pickup operation.

For this purpose the brake drum 125 is secured to the side wall 29 of the reel by means of a series of bolts 126, the brake thus being located closely adjacent the main bearing 20, the brake flange preferably being arranged to nest with respect to the bearing as shown in Fig. 1, for the purpose of conserving space and weight.

The brake band is shown at 130 carrying suitable friction material 131. A cable loop 132 is secured to the band at one end and engaged over a fixed pin 133 which is mounted in bracket 134 secured to the base plate 10 by means of bolts 135. The opposite end of the brake band is secured through a cable loop 136 and an adjustable tention connection 137 to the pin 138 which is fixed to a lever 140 pivotally mounted for rotation about the axis of pin 133. It will be clear from Fig. 9 that the upward swinging movement of lever 140 will result in a pull through cable 136 to tighten the brake band around the drum and thus to apply the same, a downward swinging movement of lever 140 resulting in the removal of the braking force.

For the purpose of applying the brake, a pair of springs 142 are mounted side by side upon the base plate 10, and at their upper ends engage in the two ends of arm 144 which is preferably made integral with the lever 140. The springs thus act in the direction to lift the lever 140 upwardly, thereby effecting the application of the brake.

In order to control and limit the action of the springs 142, a pin 146 is threadedly received in a socket member 147 which has a rearwardly extending pin 148 over which there is received the lever arm 149, pivotally mounted as shown at 150, upon a bracket 151 suitably bolted to the base plate. An upwardly extending lever arm 152 is fastened to shaft 150 so that upon actuation thereof, the shaft 150 is rotated, and arm 149 is raised or lowered to thus effect the compression of the springs 142 when desired to cock the brake mechanism. A suitable connection indicated diagrammatically at 153 is made from the end of lever 152 and extended into the control position in the cockpit or other suitable point to provide for the operation of the lever under the control of the pilot.

The pin 146 has an enlarged head 154 which extends upwardly centrally of the arm 144, the central aperture however having a smaller size than the head 154 so that the position of the head 154 limits the upward travel of the arm under the action of springs 142. A kerf 155 is formed in the head to provide for the insertion of a screwdriver to determine its setting relative to the socket 147, thus predetermining the upper limit through which the springs can force the lever arm and thereby regulating the force with which the brake is applied.

When the device is set for the making of a pickup, it is desired to hold the friction brake in disabled condition, and for this purpose a latch member 160 is provided which is pivotally mounted upon shaft 161, the tongue 162 of the latch member being adapted to be received at the point 163 on top of lever 140. The lever 140 has an aperture 164 into which the tongue 162 slips upon the tripping of the latch, thus permitting the lever to be raised and the brake applied under the action of the springs.

A stem 166 is secured to the latch 160 and suitable connection indicated diagrammatically at 167 is made to the cockpit or other control point to permit the pilot to control the position of the latch member. Preferably at some time prior to the making of the pickup, the control is actuated to cause the tongue of the latch to occupy the position shown at 162 on top of the lever 140, thereby effecting withdrawal of the braking action, while leaving the mechanism in position where the brake can be tripped to immediately apply the brake.

In order to cause the brake to be applied at a definite point in the pick-up cycle, and preferably when the load has been substantially fully accelerated under the action of the hydraulic brake and with the desired amount of cable having been unwound, means are provided for causing the tripping of the trigger mechanism so that the brake will be applied automatically at the proper time without requiring any attention on the part of the operator.

Figure 9:
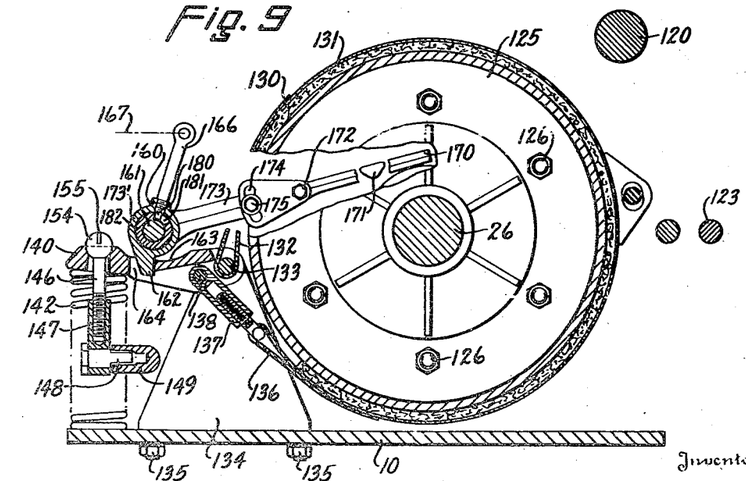
Fig. 9 is a vertical sectional view through the friction brake and trip mechanism on the line 9—9 of Fig. 2, certain parts being broken away to more clearly show the construction thereof.
Figure 10:
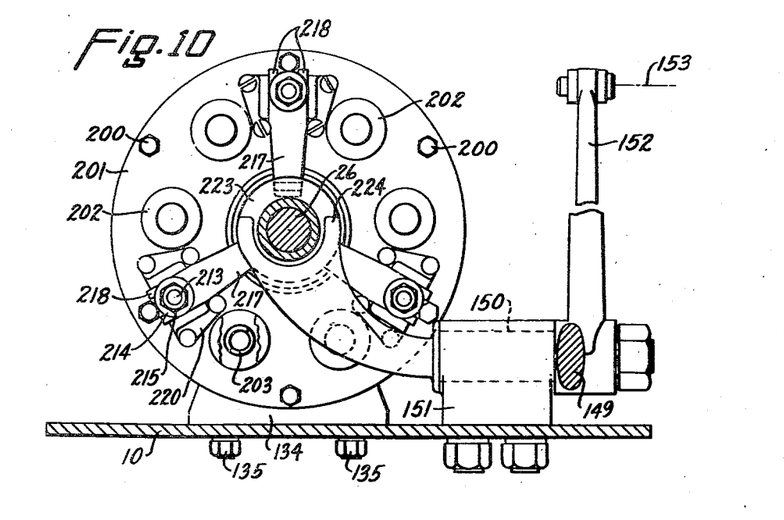
Fig. 10 is a vertical sectional view showing the clutch operating mechanism on the line 10—10 of Fig. 2.

For this purpose a follower member 170 is provided which is adapted to ride upon the outermost layer of the cable coiled on the reel, the cross-section of the follower being as indicated in the broken view in Fig. 9, forming a lower surface 171 of relatively small width which is the actual surface in contact with the cable.

Follower 170 is pivotally connected by means of bolt 172 to an arm 173, and is provided with an elongated slot 174 in which there is received a locking bolt 175 making it possible to adjust the angular relation between follower 171 and arm 173, fixing the exact position at which the brake mechanism is applied.

Arm 173 is integral with a collar 173' which is fixed to the cross shaft 161, in order to rotate therewith, the shaft being journaled at one end in bracket 176 and at the other in a portion of bracket 12. Torsion spring 177 has one end attached to the supporting bracket 176 and has its opposite end fixed to the shaft 161 to thus provide for normally urging the follower into engagement with the coil on the reel.

Shaft 161 is connected to the latch member 160 through a lost-motion connection comprising a pin 180 carried by the latch member, riding in an enlarged groove 181 on the collar 182 which is fixed to the shaft 161.

Figure 2:
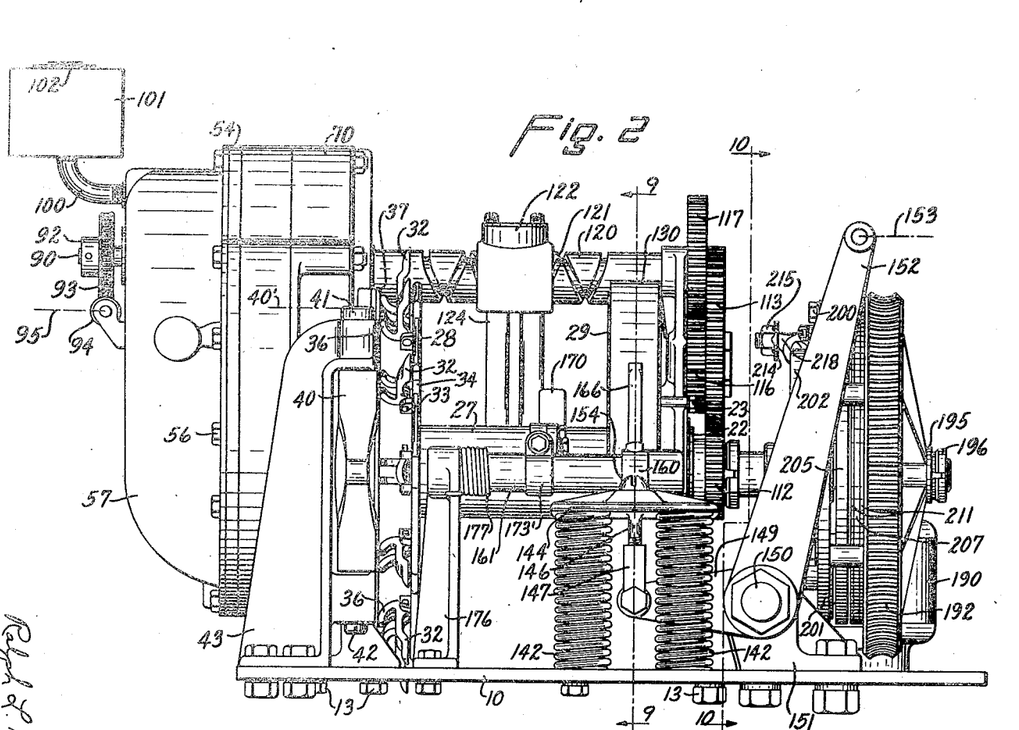
Fig. 2 is a side elevational view of the same.
Figure 3:
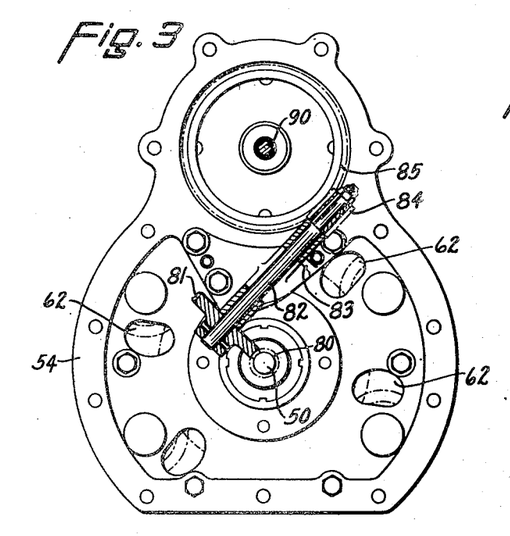
Fig. 3 is a vertical sectional view on the line 3—3 of Fig. 1.

From the above description it will be understood that in response to the manual rotation of lever 152 in a counter-clockwise direction is shown in Fig. 2, springs 142 will be depressed, drawing lever 140 down until the tongue of the latch 160 is clear of the notch in the lever. Thereupon, by the actuation of the pilot's control indicated at 167, the latch tongue 162 may be rotated in a counter-clockwise direction, with the result that the tongue rides into a holding position on the upper surface of lever 140, thereby retaining the brake in an off position. The clearance provided between the pin 180 and the notch 181 permits the feeler arm 170 to rise upwardly as the cable is wound in, without disturbing the setting of this trigger mechanism. However, when the cable is unwinding, and when the feeler arm 171 has been lowered to predetermined position, the edge of the groove 181 is brought into engagement with pin 180, thereby causing the clockwise rotation of the latch member, to withdraw the end thereof from contact on the upper surface of the lever 140, the tongue of the latch slipping into the aperture 164. Thereupon the springs 142 are released, and effect the application of the friction brake to complete the stopping of the rotation of the drum and to hold the same in fixed position preventing further unwinding action thereof.

When the pickup has been completed and the load placed in full flight at the speed of the towing plane, it is spaced from the towing plane by the full length of the cable which has been unwound in addition to the necessary hook and connecting cables including such shock absorbing mechanism as may be used. This spacing is not desirable for the continued towing operation, it usually being desired to reel in the larger portion at least of the cable and thus tow the glider or other load at a lesser spacing from the towing plane. In order to accomplish this, the invention provides a power actuated drive means for effecting the rewinding of the cable under load, this mechanism preferably incorporating a power source operating through a relatively large reduction gear, since it is not necessary that the rewinding operation be performed rapidly, and because in this way a smaller and lighter weight drive mechanism may be utilized. Preferably the device comprises an electrical motor which is clutch connected to provide for the reeling in of the cable under the control of the pilot, with the operation thereof being correlated with the friction brake to provide for concurrent power operation of the motor accompanied by the removal of the friction brake, the brake being again applied when the reeling action is discontinued.

For this purpose a reversible electric drive motor 190 is mounted in fixed position upon the base plate, being provided with a worm drive shaft which meshes with worm wheel 192 formed as part of the clutch plate 193, freely rotatably mounted upon the overhanging end 194 of the main shaft 26. A washer 195 and a lock nut 196 provided for securing the clutch plate in position upon the shaft.

A series of bolts 200 extend through the outer periphery of the clutch disc 193 and carry in spaced relation therewith a plate 201 which forms a support for a series of housings 202 within which there are located the compression springs 203 by means of which the clutch is caused to engage. These springs project through the plate 201 and at their forward faces bear against the ring 205, which is spaced from the clutch plate 193. Between plate 193 and ring 205 there is located the clutch disc 207 which is secured by means of rivets 208 to a collar 209 which is splined on to the projecting and overhanging end of shaft 26, the splines being shown at 210. Clutch disc 207 carries friction elements 211 on the opposite sides thereof so that when the ring 205 is urged forward by springs 203, a frictional and driving contact is established between the clutch disc 207, and the clutch plate 193 and ring 205.

The clutch is disengaged through the action of a series of rods 213 which are fixed in ring 205, and which have cam discs 214 secured thereon by means of nuts 215. A series of operating arms 217 having outwardly extending bifurcated cam shaped ends 218 are arranged to straddle the rods 213, such that the cam shaped ends bear against and effect the axial travel of the discs 214 to provide for the withdrawal of the ring 205 against the action of the compression springs 203. The arms 217 are suitably supported in brackets 220 which thus effect the rotation of the arms with the ring 205 and the clutch plate 193 about shaft 26, while permitting the pivotal movement of the individual arms 217 to develop the camming action above described.

Control of the several arms 217 is secured through the provision of a bulb shaped surface 222 at the inner ends thereof adjacent shaft 26, against which an axially slidable collar 223 is adapted to bear. The position of collar 223 is controlled axially of shaft 26 by means of a yoke 224 which is actuated from shaft 150, and hence under the control of the lever 152 and the pilot's control 153.

Figure 5:
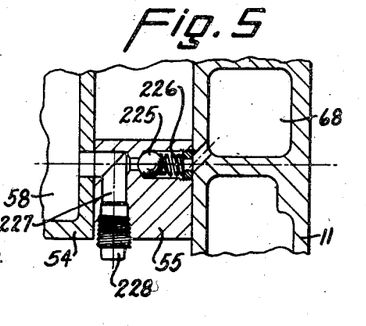
Fig. 5 is a fragmentary sectional view on the line 5—5 of Fig. 4 showing the pressure relief valve and drain plug.

The arrangement shown provides a relatively slow rate of rewind and the valve ports 71 and 74 will progressively register and decrease the hydraulic load as the rewinding proceeds. In order to relieve the mechanism entirely of such load, a check valve 225 is preferably provided in the wall of chamber 55 as shown in Fig. 5. Such valve is spring urged toward its seating position by spring 226, the valve communicating between the reservoir 58 and pressure manifold 68 by suitable ports formed in members 54, 55 and 11, as shown. A drain passage 227 is also provided for draining the fluid from reservoir 58, the passage being closed by plug 228. It will be clear that the hydraulic pressure from the manifold will close the valve during the unwinding operation, while an excess of pressure in the reservoir over that in the manifold during rewinding will unseat the valve and thus by-pass the throttling aperture, removing the load from the hydraulic mechanism during the rewinding operation.

It will also be evident that a similar valve may be provided in communication with the high pressure manifold 68 but arranged to operate in the reverse direction, being suitably spring loaded so that in the event of some unusual condition, the hydraulic pressure will be relieved and discharged back into reservoir 58 before it reaches a dangerously high value.

From the above it will be understood that during the pickup operation, and until the initial application of the friction brake 130, lever 152 remains in the position to effect the disengagement of the clutch, that being the position shown in Fig. 1 where the collar 223 has been moved axially to the right, causing the camming of the rods 213 to the left, thus holding the clutch plates in disengaged relation against the action of springs 203. When the friction brake is automatically applied, no change in the position of lever 152 occurs and thus the clutch continues to be held in disengaged relation. When however the pickup has been completed and the friction brake applied, and it is desired by the pilot to reel in the cable and shorten the distance between the towing plane and the load, the pilot then being relieved of the necessities for close observation of the plane itself is free to effect the manual actuation of lever 152 in the direction to cause the engagement of the clutch, accompanied by the simultaneous release of the friction brake, through the concurrent action of lever arm 149 in producing a compression of springs 142. In this latter connection, it will be noted that it is not desired at this time to effect the cocking of the trigger mechanism for the friction brake, and accordingly the pilot's control 167 for this mechanism is not actuated so that immediately upon the disengagement of the clutch, the friction brake is again applied.

The electric motor 190 is energized following the actuation of lever 152 to engage the clutch and remove the brake; however the provision of the worm gearing as illustrated effectively acts as a one-way brake, and prevents the reverse driving of the motor under the action of the load, even if the motor is not energized immediately. The clutch having been engaged, the motor may be energized to effect the reeling in of the desired amount of cable, and the motor being reversible may be reversed at any time to unreel additional cable if desired. When this proper length of cable is determined, it is preferred to disengage the clutch and to apply the friction brake, thereby holding the load in the desired position during the remainder of the flight.

In the event that the load so picked up is to be released and another pick up made, it will be understood that it is only necessary for the pilot to actuate the control 153 in the direction to effect the compression of springs 142, and while so compressed to simultaneously actuate the trigger control 167, following which the control 153 is returned to the alternative position where the clutch is disengaged and the brake applying lever 140 is under the control of the trigger arm 160. Thereafter the pick up cycle is followed out in the same manner as described above.

In order that the entire operation of the mechanism may be controlled from a remote point, such as the cockpit of the plane, or any other suitable control location, a control panel is provided on which are mounted the necessary indicators and control members for the purpose, suitable interconnections being provided, comprising the necessary electrical connections, Bowden wire controls, flexible shafts etc., as desired. Thus referring to Figs. 11A to 11F, the six individual figures A to F represent the position of the various control members and indicators throughout the various stages of the operation.

Figure 11A:
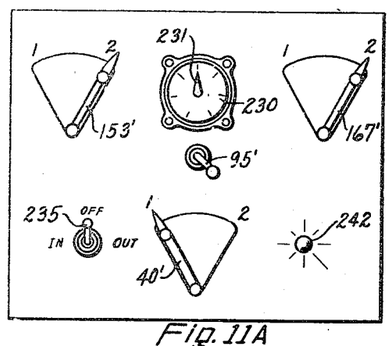
Figs. 11A to 11F inclusive are views representing the control panel and showing the several different operative positions of the controls.

Referring to the Fig. 11A, a control arm for controlling the actuation of clutch lever 152, and comprising an arm 153' is represented, it being understood that this arm has suitable connection indicated at 153 with the lever 152, so that in response to the manual movement of the control arm 153' from position 1 to position 2, a corresponding movement is effected of the lever arm 152.

When the arm 153' is in position 1, the friction brake is released, and the clutch is engaged. When the arm is in position 2, the clutch is released, and the brake is either on or is held off but cocked in position to be released at the proper time during the pickup operation.

Indicator dial 230 is suitably calibrated as shown for example in terms of thousands of pounds of weight of the load to be picked up. An index member 231 in the shape of a pointer is connected in any suitable manner with the adjustable valve 75 so that its indication corresponds with the setting of the valve for the different weights of load. A manually rotatable actuating crank 95' is located on the control panel which is suitably connected with shaft 94 to effect rotation thereof for pre-setting the selector valve 75, bringing the selected aperture 74 into the desired registering relation with the orifice. In the panel as shown, the dial has been set to provide proper accelerating conditions for the picking up of a 14,000 pound glider.

A control arm 167' is provided at the righthand side of the panel, also having two operative positions. This control arm is suitably connected to the end of the pin 166 by means of a connection 167, and may thus be actuated by the pilot from its position 2 where the brake is on to position 1 where the latch member is set in its cocked position.

At the lower side of the panel there is provided a control switch 235 which has a central off position, and two opposite energizing positions for controlling the reverse operation of drive motor 190, thus providing for the control of that motor to selectively reel the cable either in or out.

A manual control 40' is provided for selectively controlling the operation of the cable reel fingers. This control is suitably connected to the yoke 40, and has two positions. In position 1 the ring 37 is moved to lower the fingers 32 into position on the reel, while in position 2 the ring is withdrawn and the fingers are free to move to the clearance position in the manner described above.

In order that the pilot or operator may know the proper point in the rewinding cycle at which the control 40' should be moved to position 1 to hold down the fingers, a suitable indicator is provided. This preferably is in the form of a switch which is actuated when the cable builds up to the level of the next to the outermost layer, and the winding of the outermost layer is about to commence. Such switch may be located for actuation in accordance with the position of feeler arm 170 as it follows the depth of cable which is wound on the drum. If desired such switch may also be actuated in accordance with the position of sleeve 86 since its rotary or angular position is closely related with the winding and unwinding of the reel. Thus Fig. 1 shows an illustrative arrangement in which switch 240 carried on a fixed part of the casing is actuated at a predetermined point in the unwinding cycle by means of an arm 241 carried by sleeve 86. The switch is suitably connected to a light 242 on the panel, and when the indicator shows that the final layer is about to be wound, the operator may then move the cable finger control from position 2 to position 1, so that in the final winding operation the last several turns of the outermost layer will be wound over the fingers, thus holding them in place in the manner described above. It will be understood that by providing a series of similar switches suitably located and connected with corresponding cockpit lights, a continuous indication of the amount of cable unwound from the reel can be given the operator.

Fig. 11A shows the parts at the beginning of the operation, the first step being the setting of the selector valve 75 in accordance with the weight of the load to be picked up by rotating crank 95'.

Figure 11B:
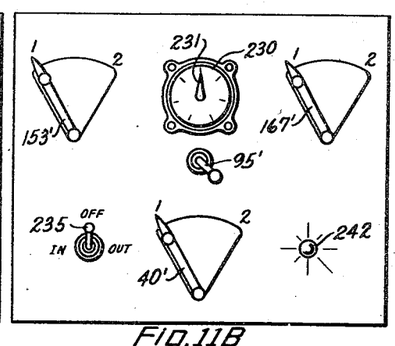

As shown in Fig. 11B, the next step is to set the control 153' to position 1, thereby effecting the engagement of the clutch and the release of the brake, while concurrently depressing the brake applying springs 142. While those springs are depressed and lever 140 is held down through the action of lever arm 149, control 167' is moved to position 1 thereby setting the latch member in cocked position on the upper face of the brake applying lever 140.

Figure 11C:
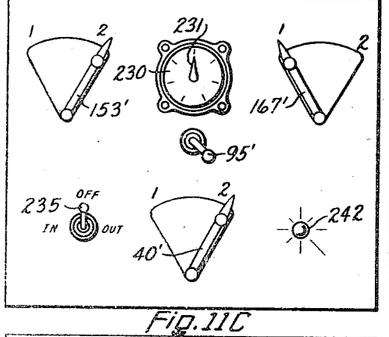

In Fig. 11C control 153' is returned to its number 2 position effecting disengagement of the rewind clutch, the friction brake however remaining off because of its being latched in its released position. Control 167' remains in position 1, but control 40' is moved to its position 2 thereby releasing the cable fingers to permit their withdrawal immediately after the first few turns are unwound from the reel. The device is now in position ready for the pickup, and no further attention is required on the part of the operator who, if acting as the pilot, is left free to manipulate the plane to bring it into the proper position where a hook or other mechanism carried by the body of the plane will engage a loop or other suitable connecting line attached to the load.

Figure 11D:
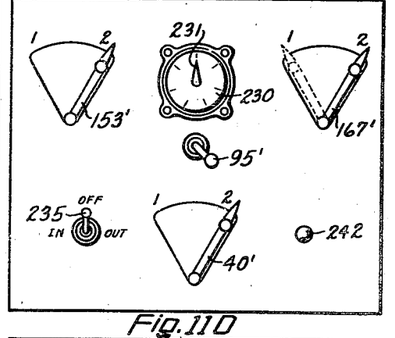

Referring to Fig. 11D, as the pickup is made and the cable unwound, control arm 167' moves from its position 2 to position 1, at the time when the feeler element senses the unwinding of substantially the full length of cable, the main hydraulic brake at that time having substantially completely checked the unwinding action of the reel. This operation takes place automatically without attention on the part of the operator, and at this time the friction brake is applied to prevent further unwinding, and to hold the load with the full length of cable unwound therefrom. Flight may be continued indefinitely under these conditions, or until the plane and the load have regained a desired altitude.

Figure 11E:
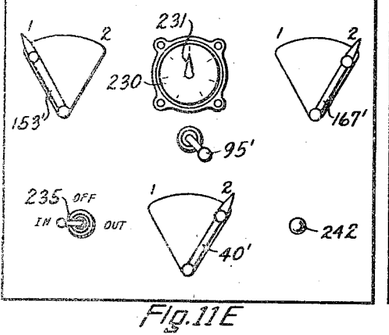

Fig. 11E shows the condition when the line is reeled in to locate the load at a lesser distance from the towing plane. Control 153' is moved to its position 1 to remove the action of the friction brake and then to cause engagement of the clutch. The reel is not permitted to turn, however, because the worm gear 192 and its associated worm pinion do not permit a reverse drive. The switch 235 is then turned to the position to energize motor 190 to provide for reeling the cable in, the motor rewinding the reel at a very much reduced speed relative to the speed in which it is unwound during the pickup. The time required for the complete unreeling of the cable during the course of the pickup operation, as above indicated, is of the order of a few seconds, while a much longer time may be used for the rewinding of the same length of cable, for example up to approximately ten minutes. As a result of this relatively very much slower rate of rotation, the pressure developed in the hydraulic brake and consequently the braking action thereof are much reduced or rendered negligible, such action being further assured by the action of the pressure relief valve 225. The switch 235 may be actuated to cause the motor to either reel cable in or out to thus position the load at the most favorable or desired spacing.

Figure 11F:
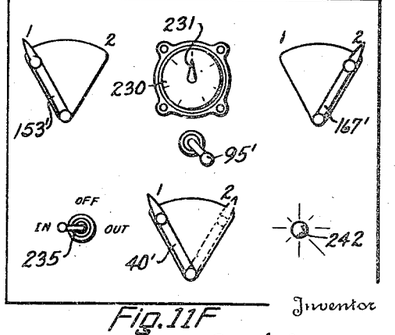

Fig. 11F shows the final relations during the rewind. When the cable finger control is reset under the final few turns, the control clutch is engaged, and the motor switch is set to rewind, the indicator 242 then showing the stage of the rewinding at the beginning of the final layer on the reel. Within a few seconds after this indicator shows the commencement of that layer, the pilot or operator moves control 40 from its position 2 to position 1, thereby actuating the cable fingers to their down position so that as the final winding is completed, they will be held in place by the cable itself, the switch being then shut off, and the device being in condition for the beginning of the cycle as described above.

As a specific example, the device will be described as adapted for picking up a glider weighing 14,000 pounds. It is assumed that it is desired to accelerate the glider at a maximum rate of 1 g, i. e., 32 feet per second per second, the pull in the cable thus being 14,000 pounds. A steel cable is used having a diameter of $\frac{7}{16}$ inches and a total strength of 17,600 pounds. A plane speed is assumed of 150 miles per hour with a maximum glider speed of 100 miles per hour.

From the above it is evident that the time required to accelerate the glider up to a speed of 100 miles per hour at an acceleration rate of 1 g can be mathematically determined, being 4.56 seconds. In this period of time the tow plane slows down from 150 miles per hour to 100 miles per hour, while the glider accelerates from zero to 100 miles per hour. The amount of cable reeled off will be the difference between travel of the plane and the glider in that time which may be shown mathematically to be approximately 500 feet.

It will be evident that the successive layers of cable in the reel will vary progressively in diameter and circumference, and it may be shown that for a reel having a pitch diameter of the innermost wrap of 4 inches, and an axial length of 10 inches there will be 22 wraps per layer increasing to a pitch diameter of 14½ inches at the thirteenth layer, giving a cumulative length of cable of 689 feet. It will of course be understood that these figures are given as representative only.

Figure 12:
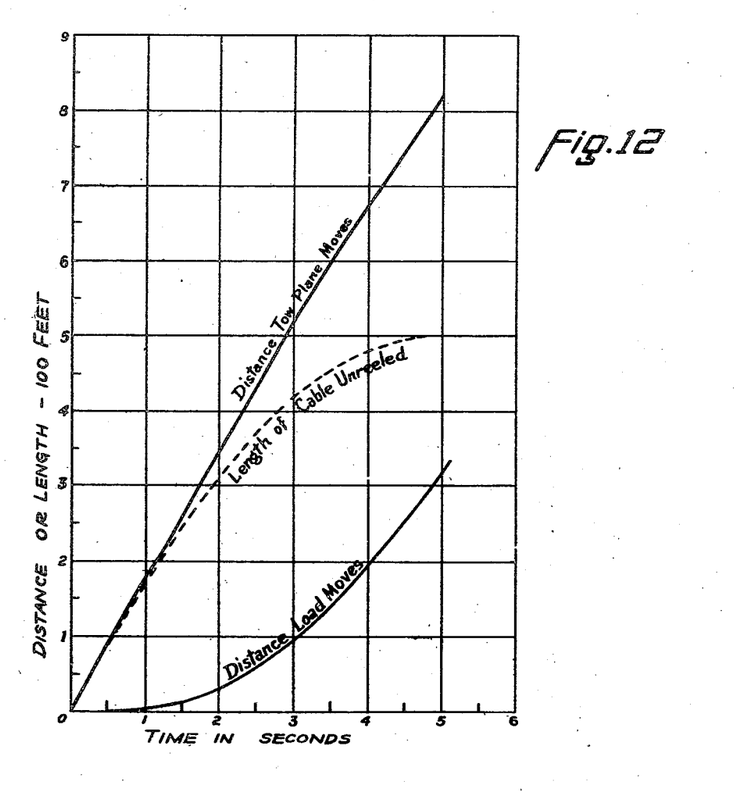
Fig. 12 is a graphic representation of the distances through which the plane and the load travel during the pickup, and the extent of cable unreeled.

Fig. 12 is a graphic representation of the several relationships involved including the distance traveled by the tow plane and the glider, and the length of cable which is unreeled in the specific example above referred to.

Figure 13:
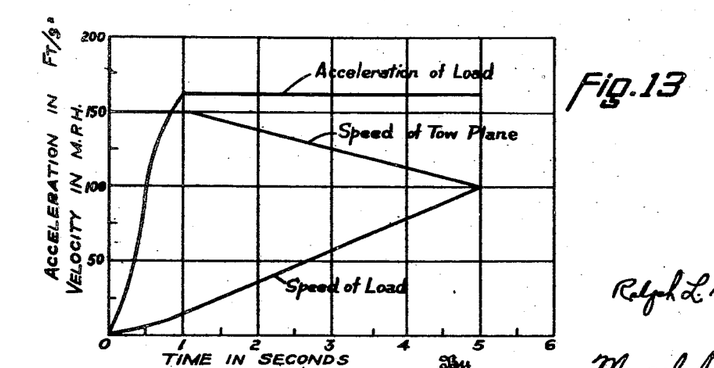
Fig. 13 is a diagrammatic representation of the velocity and acceleration relationships during the pick up operation.

Fig. 13 is a graphic representation of the speed of the plane and the glider, and the acceleration of the glider. From these graphs the typical relationships between the several moving bodies may be analyzed. From these graphs it will be seen that the distance traveled by the load gradually increases. The distance traveled by the plane is at all times greater than that traveled by the load but gradually decreases, the difference between the two representing the length of cable which is unreeled. After a brief initial period, the rate of change of both the speed of the load and the speed of the towing plane are substantially uniform, thus providing for constant acceleration of the load as indicated.

The actual volume of liquid required to be handled by the pumps may be determined by engineering analysis, and likewise the area of the orifice in order to provide the desired uniform acceleration rate throughout the entire operation. As typical examples, the gear pumps may have a face width of two inches, and a diametral pitch of five inches. Where a load up to 14,000 pounds is to be picked up it is preferred to make use of six pump gears rather than the four shown in the drawing, this number being varied as desired. The cross-sectional area of the orifice through which the fluid is forced may vary from 0.58 square inch maximum at the beginning of the unreeling down to an area of .274 square inch at the beginning of the unwinding of the last layer on the reel, the area being finally reduced to zero when the desired length of line has been unreeled. The fluid pressure varies from the maximum 5290 pounds per square inch down to 2740 pounds per square inch when the orifice is closed. Corresponding representative figures for an orifice setting for the picking up of a 5,000 pound load are 0.97 inch maximum, 0.46 square inch, and zero, the corresponding pressures ranging from 1380 pounds per square inch down to 975 pounds per square inch.

In order to take up the initial shock when the pickup is first made, it is preferred to make use of a shock relieving means for providing a brief interval of time within which the reel and the cable thereon can be set in rotation at the desired and necessary speed. This period of time will vary with the moment of inertia of the rotating parts but is actually quite short, and measured in terms of a few hundredths of a second. This mechanism may comprise a shock absorber formed as a part of the connecting line on the glider, or may comprise a length of flexible and expansible line such as a nylon cable. For example, in the picking up of a 14,000 pound load, a time period of 0.05 second is provided for accelerating the reel itself, and a length of nylon cable of 40 feet may be used to give the necessary flexibility in the pickup line.

If desired a flexible or yieldable means may be incorporated in the drive connection between the reel and the shaft providing for the initial free acceleration of the reel at the instant the pickup contact is made. Such device thus frees the reel of any load imposed by the braking means, and by reducing the moment of an inertia of the parts thus required to be placed in immediate rotation, the shock load on the pickup cable is substantially reduced. As soon however as initial rotation of the reel has been established, the yielding means provides for then establishing a direct connection between the reel and the shaft so that upon continued operation, the braking mechanism is operated in the manner already described.

Figure 14:
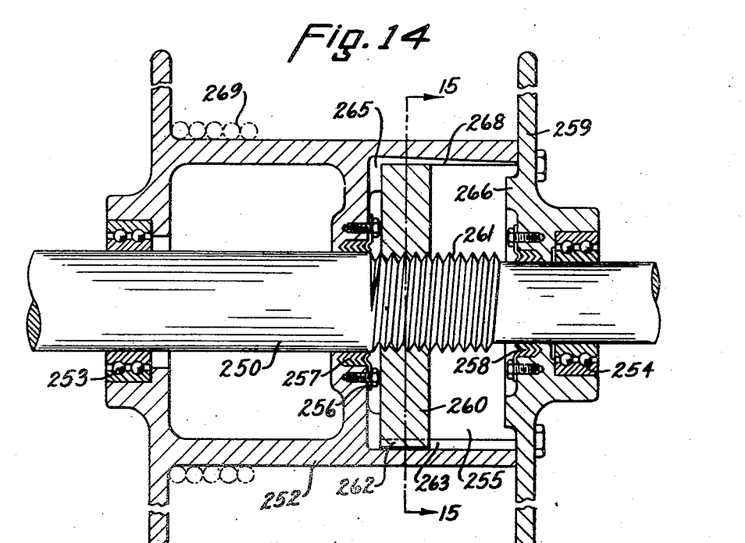
Fig. 14 is a broken sectional view showing a reel provided with a flexible connection to the main shaft carrying the braking means.
Figure 15:
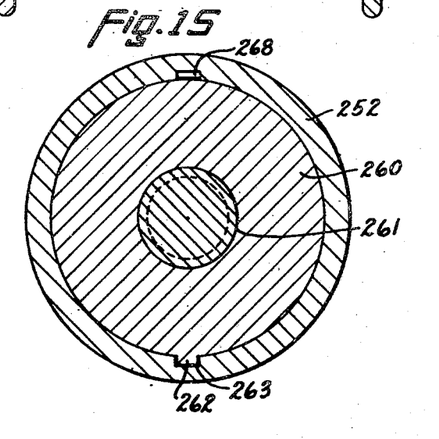
Fig. 15 is a cross-sectional view on the line 15—15 of Fig. 14.

Referring to Figs. 14 and 15, the main drive shaft is shown at 250, the reel 252 being mounted for relative rotation thereon, and journalled on ball bearings 253, 254. The inner wall of the reel defines a cylindrical chamber 255, the chamber being of limited extent axially of the shaft and being enclosed by means of a plate 256 which is mounted in fluidtight relation upon the inner periphery of the reel wall. Suitable chevron type packing means 257 is provided between the plate 256 and shaft 250 to maintain a closed fluid chamber. Similar packing 258 is provided between the end wall 259 and the shaft so that the fluid is effectively confined within the pressure chamber 255.

A traveling nut 260 is threadedly received on threads 261 formed on the shaft, the nut having an outwardly extending tongue 262, engageable in a groove 263 formed in the inner wall of the reel. As a result of such tongue and groove connection, nut 260 will be caused to rotate with the reel, but may move axially of shaft 250. Such axial movement is limited in one direction by means of an abutment ring 265, and in the other direction by a raised annular boss 266 which is formed on the end wall 259 of the reel.

To control the yielding action, a by-pass groove 268 is formed in the inner wall of the reel, the cross-sectional area of which is relatively small and which preferably tapers in one direction to provide a progressively increasing resistance to the flow of fluid therethrough.

In operation and in preparation for making a pickup, the parts are in the relative positions shown in Fig. 14. Immediately upon the pickup contact being established, a pull is developed in the cable 269 which tends to accelerate the rotation of the reel. As the reel turns, nut 260 also turns. However shaft 250, because of its additional inertia and the resistance created by the pump gears and other connected parts, is not yet in rotation; consequently nut 260 advances on the threads 261 toward the right as viewed in Fig. 14. In so advancing it reduces the size of the fluid chamber 255, forcing the fluid through the by-pass 268 and around to the opposite side of the nut. As this action continues, and by reason of the progressive reduction in the area of the by-pass passage, an increasing resistance is developed to such travel of the nut, thereby gradually developing a rotary force with respect to shaft 250. This results in the gradual acceleration of the shaft and its associated pump gearing up to the full speed of rotation of the reel, the load thus being gradually developed and without developing an excessive shock condition upon the mechanism. Toward the end of its travel, the hydraulic pressure has been so developed as to substantially prevent relative rotation between the nut and the shaft, and as a result when the nut finally seats against the abutment 266, the shaft has been accelerated to the full rotary speed of the reel. Thereafter the yielding means is ineffective and the unwinding continues with the reel and the shaft directly connected together. It will also be clear that in response to the rewinding action, power applied to shaft 250 to cause rewinding of the cable will result in the initial backing off of the nut from the abutment 266, until the opposite face of the nut engages the abutment 265 whereupon the drive will be direct from the shaft to the reel, and the parts will be in proper position in preparation for a subsequent pickup operation.

The extent of this yielding action may be predetermined as desired by properly selecting the length of the threaded portion over which the nut may travel and by suitably selecting the other elements of the construction. Ordinarily, however, it is found advantageous to provide for only a relatively small number of turns of the reel prior to the establishment of direct driving relations, to avoid materially increasing the length of the cable which is required to be carried, and providing the desired relative freedom of rotation of the reel for only the short interval of time required to accelerate it up to its unwinding speed.

In Fig. 16 there is shown a construction of expansion chamber which makes it possible to maintain a predetermined pressure on the fluid circulated by the hydraulic brake and eliminating air from the presence of the fluid, thus making it possible to operate the fluid at a relatively higher temperature without incurring danger of the flashing of the fluid. Thus the conduit 100' is similar to conduit 100 as described above and is connected into the reservoir containing the braking fluid, control valve 275 being included for controlling the operation thereof. The upper end of the conduit is threaded and receives thereon a cylinder 276, the cylinder having threads 277 on its outer periphery. The cylinder is closed by an end cap 278 which is correspondingly threaded to be adjustably received over the cylinder.

A piston 280 is mounted for movement in the cylinder, and is spring pressed toward the lower end of the cylinder by means of compression spring 281, the upper end of which rests against the end cap 278. It will be evident that by suitably adjusting the position of the end cap 278 upon the threaded cylinder, the compression of the spring 281 may be controlled, and a predetermined pressure condition thus established with respect to the piston.

In operation, as the temperature of the fluid circulated by the pump increases in the course of the unwinding operation, it develops an expanding pressure which acts to raise piston 280 against the action of spring 281. With suitable choice of the spring, the pressure maintained within the chamber may be substantially uniform, or increase only to the extent desired, and it will be seen that the presence of a body of air over the fluid is eliminated, the entire fluid system remaining substantially closed and sealed during heating and subsequent cooling. If desired suitable bleed ports may be provided to bleed out any air which may be present in the fluid system, keeping it always completely filled with the fluid. As a result, the fluid which may comprise a suitable grade of oil having a high flash point, may be allowed to increase in temperature up to a relatively high degree of temperature approaching the flash point, but will be protected and prevented from flashing and burning because of its being completely enclosed and because of the exclusion of the air therefrom. This construction therefore further contributes to the reduction in the quantity of fluid necessary to be used with corresponding reduction in the weight of the entire device. The construction of this Fig. 16 therefore may thus be used either as supplementary to or in place of the check valve 106 and its assembly, the operation of which is described above.

It will be evident without further detailed analysis that the device may be utilized in a similar manner as an arresting gear; in such case the mechanism may be carried by the plane or other moving body but is preferably located on the base on which the landing is made, such as an aircraft carrier, or other relatively stationary body.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A pickup device of the character described for use on an aircraft for picking up a load in flight comprising a reel containing a length of pickup cable thereon adapted to be unreeled as the pickup is made, main brake means for controlling the unwinding of said reel, auxiliary brake means for holding said reel against movement when the load has been picked up, means for automatically applying said auxiliary brake means when the unwinding of said cable has been substantially stopped by said main brake, power actuated means for rewinding said cable, and control means for operating said power actuated means and concurrently releasing said auxiliary brake means.

2. A pickup device of the character described for use on an aircraft for picking up a load in flight comprising a reel containing a length of pickup cable thereon adapted to be unwound as the pickup is made, main brake means for controlling the unwinding of said reel, auxiliary brake means for holding said reel against movement when the load has been picked up, means for automatically applying said auxiliary brake means when the unwinding of said cable has been substantially stopped by said main brake, power actuated means for rewinding said cable including a clutch, means for controlling said power actuated means, and means for effecting concurrent engagement of said clutch and the release of said auxiliary brake.

3. A pickup device of the character described which comprises a reel for receiving a length of tow cable thereon adapted to be unreeled as the pickup is made, hydraulic brake means for controlling the unwinding of said reel to provide increasing resistance thereto with substantially uniform acceleration of the load, means for adjusting the action of said brake means in advance of the pickup in relation to the characteristics of the load to be picked up to provide for proper controlled acceleration thereof, a friction brake for stopping the rotation of said reel, a source of power, clutch means for coupling said source of power to said reel for rewinding said cable during the towing operation to establish a desired spacing between towing plane and the load, and means operable upon engagement of said clutch for releasing said friction brake.

4. A pickup device of the character described which comprises a reel for receiving a length of tow cable thereon adapted to be unreeled as the pickup is made, hydraulic brake means for controlling the unwinding of said reel to provide increasing resistance thereto with substantially uniform acceleration of the load, a friction brake for stopping the rotation of said reel, means operable when the reel retains a predetermined minimum amount of said cable for effecting the application of said friction brake, a source of power, clutch means for coupling said source of power to said reel for rewinding said cable during the towing operation to establish a desired spacing between towing plane and the load, and means operable upon engagement of said clutch for releasing said friction brake.

RALPH L. KERR.

REFERENCES CITED

The following references are of record in the file of this patent:

UNITED STATES PATENTS

| Number | Name | Date |
| --- | --- | --- |
| 456,763 | Gibbins | July 28, 1891 |
| 560,210 | Herdman | May 19, 1896 |
| 1,070,197 | Snell | Aug. 12, 1913 |
| 1,313,719 | Miller | Aug. 19, 1919 |
| 1,359,993 | House | Nov. 23, 1920 |
| 1,479,023 | Beck | Jan. 1, 1924 |
| 1,622,139 | Getchell | Mar. 22, 1927 |
| 1,806,549 | Wallace | May 19, 1931 |
| 1,809,266 | Castro | June 9, 1931 |
| 1,813,694 | Bowman | July 7, 1931 |
| 1,841,791 | Dalmace et al. | Jan. 19, 1932 |
| 1,843,793 | Wagner | Feb. 2, 1932 |
| 1,992,911 | De La Mater | Feb. 26, 1935 |
| 1,992,912 | De La Mater | Feb. 26, 1935 |
| 2,019,512 | Stahl | Nov. 5, 1935 |
| 2,101,053 | Santina et al. | Dec. 7, 1937 |
| 2,104,780 | Vickers | Jan. 11, 1938 |
| 2,168,655 | Rose | Aug. 8, 1939 |
| 2,232,955 | Mathey | Feb. 21, 1941 |
| 2,243,642 | Muir et al. | May 27, 1941 |
| 2,343,884 | Coffing | Mar. 14, 1944 |
| 2,373,413 | Plummer | Apr. 10, 1945 |
| 2,373,414 | Plummer | Apr. 10, 1945 |
| 2,396,071 | Anderson et al. | Mar. 5, 1946 |
| 2,410,451 | Landry | Nov. 5, 1946 |

FOREIGN PATENTS

| Number | Country | Date |
| --- | --- | --- |
| 519,580 | France | June 11, 1921 |